(12) United States Patent
Boltz et al.

(10) Patent No.: US 8,959,907 B2
(45) Date of Patent: Feb. 24, 2015

(54) ROTATING APPARATUS

(75) Inventors: Ojvind Boltz, Thisted (DK); Manfred Boltz, Bad Salzdetfurth (DE); Stig Vindelov, Hurup Thy (DK); Mrs. Stig Vindeløv, legal representative, Hurup Thy (DK)

(73) Assignee: Inventua ApS, Struer (DK)

( * ) Notice: Subject to any disclaimer, the term of this patent is extended or adjusted under 35 U.S.C. 154(b) by 710 days.

(21) Appl. No.: 13/125,985

(22) PCT Filed: Oct. 29, 2009

(86) PCT No.: PCT/DK2009/050283
§ 371 (c)(1),
(2), (4) Date: Aug. 18, 2011

(87) PCT Pub. No.: WO2010/048962
PCT Pub. Date: May 6, 2010

(65) Prior Publication Data
US 2011/0296825 A1 Dec. 8, 2011

(30) Foreign Application Priority Data
Oct. 29, 2008 (DK) .................................. 2008 01485

(51) Int. Cl.
*F03B 13/18* (2006.01)
*F02B 13/10* (2006.01)
(Continued)

(52) U.S. Cl.
CPC ............. *F03B 13/183* (2013.01); *F03B 13/188* (2013.01); *F03B 17/061* (2013.01); *F05B 2240/311* (2013.01); *Y02E 10/28* (2013.01); *Y02E 10/38* (2013.01)
USPC .................. 60/506; 290/42; 290/53; 60/501; 60/504; 60/505

(58) Field of Classification Search
USPC ....................... 290/42; 60/495–507
See application file for complete search history.

(56) References Cited

U.S. PATENT DOCUMENTS 3,973,864 A     8/1976   Atherton
4,095,918 A *   6/1978   Mouton et al. ..................... 415/7
(Continued)

FOREIGN PATENT DOCUMENTS

DE    102004060275      6/2006
DE    102010011708 B4 *   3/2012
(Continued)

OTHER PUBLICATIONS

"Meerestechnische Konstruktionen", Claus Lehmann Ostergaard, Springer-Verlag, p. 113.

*Primary Examiner* — Thomas Denion
*Assistant Examiner* — Jessica Kebea
(74) *Attorney, Agent, or Firm* — Gifford, Krass, Sprinkle, Anderson & Citkowski, P.C.; Douglas L. Wathen

(57) ABSTRACT

The present invention concerns a rotating apparatus related to water power, particularly related to wave power, and related to conversion of energy, for instance to generate electricity. The apparatus according to the invention may comprise one or more axially connected horizontally arranged floating or neutrally buoyant rotors that are driven by a number of fins that in turn are driven by wave waterflows and/or linear waterflows, said rotors being adapted for rotation, said rotation being non-changing and independent of the direction of the waterflows. The rotational energy is preferably converted to electricity by built-in generators. In addition, the apparatus comprises an arrangement so that the apparatus is adapted to move into a position corresponding to the direction of the waterflows.

14 Claims, 5 Drawing Sheets

(51) Int. Cl.
*H02P 9/04* (2006.01)
*F03B 17/06* (2006.01)

(56) References Cited

U.S. PATENT DOCUMENTS

| | | | | |
|---|---|---|---|---|
| 4,448,020 A | * | 5/1984 | Wood et al. | 60/398 |
| 5,096,382 A | * | 3/1992 | Gratzer | 416/189 |
| 5,191,225 A | * | 3/1993 | Wells | 290/53 |
| 5,441,384 A | * | 8/1995 | Gokhman | 415/161 |
| 5,642,984 A | * | 7/1997 | Gorlov | 416/176 |
| 6,006,518 A | * | 12/1999 | Geary | 60/398 |
| 6,036,443 A | | 3/2000 | Gorlov | |
| 6,476,511 B1 | * | 11/2002 | Yemm et al. | 290/42 |
| 6,568,878 B2 | * | 5/2003 | Woodall et al. | 405/25 |
| 7,078,827 B2 | * | 7/2006 | Brewington | 290/53 |
| 7,737,570 B2 | * | 6/2010 | Costin | 290/43 |
| 7,839,007 B2 | * | 11/2010 | Filardo | 290/43 |
| 7,988,413 B2 | * | 8/2011 | Haar | 416/31 |
| 8,188,613 B2 | * | 5/2012 | Lee | 290/54 |
| 8,193,653 B2 | * | 6/2012 | Ortiz | 290/43 |
| 8,282,352 B2 | * | 10/2012 | Anderson, Jr. | 416/6 |
| 8,304,925 B2 | * | 11/2012 | Yang et al. | 290/42 |
| 8,376,688 B2 | * | 2/2013 | Haar | 415/66 |
| 8,484,965 B2 | * | 7/2013 | Von Bulow et al. | 60/495 |
| 8,610,304 B2 | * | 12/2013 | Filardo | 290/54 |
| 2005/0271508 A1 | * | 12/2005 | Beyene et al. | 416/132 A |
| 2005/0285407 A1 | * | 12/2005 | Davis et al. | 290/54 |
| 2006/0222461 A1 | * | 10/2006 | Manchester | 405/75 |
| 2007/0241566 A1 | * | 10/2007 | Kuehnle | 290/53 |
| 2009/0284015 A1 | * | 11/2009 | Sack | 290/53 |
| 2009/0309365 A1 | * | 12/2009 | Sauer et al. | 290/53 |
| 2011/0103958 A1 | * | 5/2011 | Arlitt et al. | 416/205 |
| 2011/0142656 A1 | * | 6/2011 | Arlitt et al. | 416/204 R |

FOREIGN PATENT DOCUMENTS

| | | | | |
|---|---|---|---|---|
| DK | 171714 | | 7/1995 | |
| GB | 1562174 A | | 3/1980 | |
| GB | 2461983 A | * | 1/2010 | F03B 7/00 |
| WO | PCT/CH80/00020 | | 8/1980 | |
| WO | WO-0244558 A1 | | 6/2002 | |
| WO | WO-2008093037 A1 | | 8/2008 | |
| WO | WO 2008093037 A1 | * | 8/2008 | F03B 3/14 |

* cited by examiner

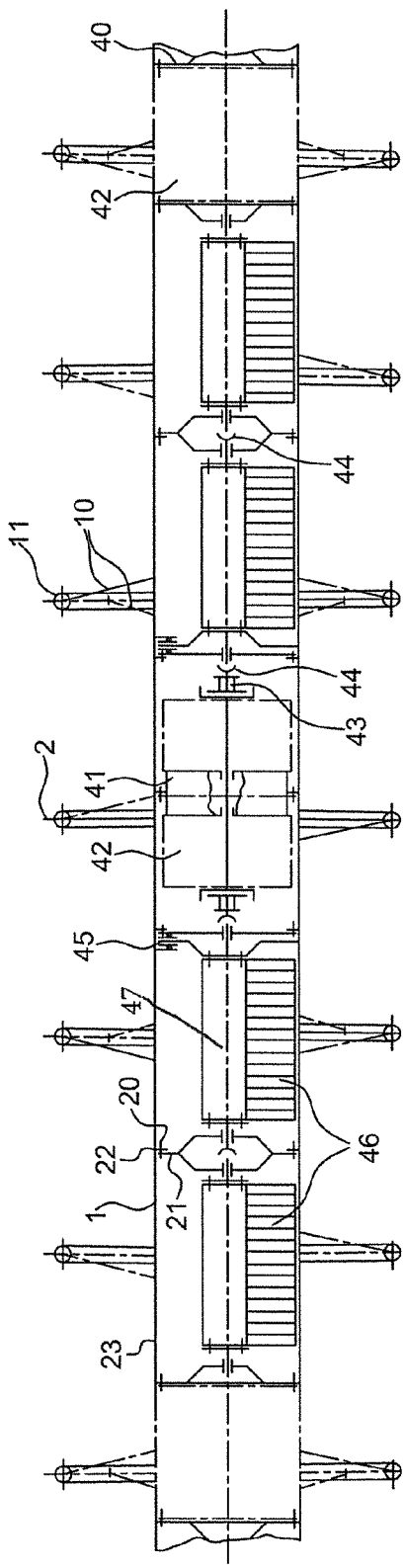
FIG. 7
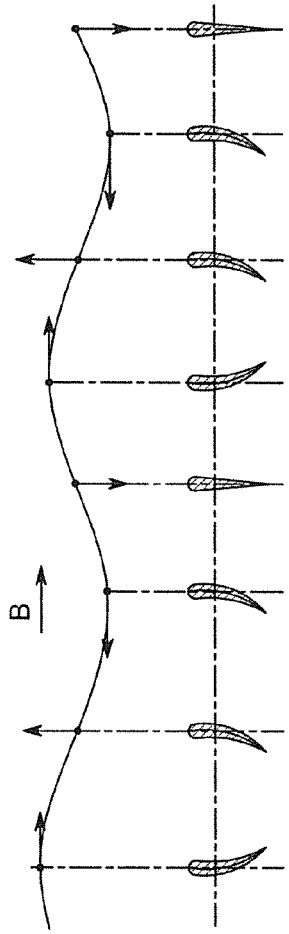
FIG. 9
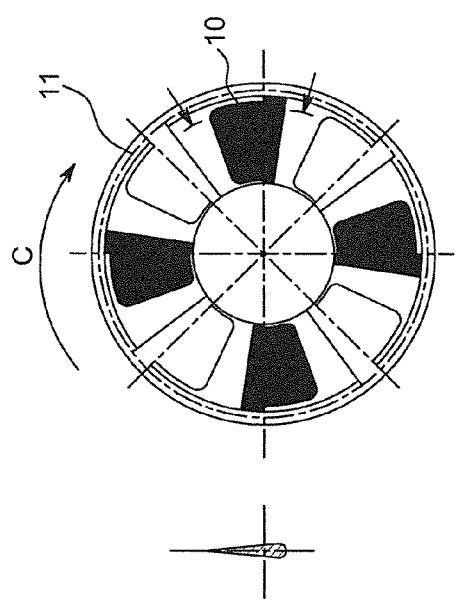
FIG. 8A
FIG. 8B

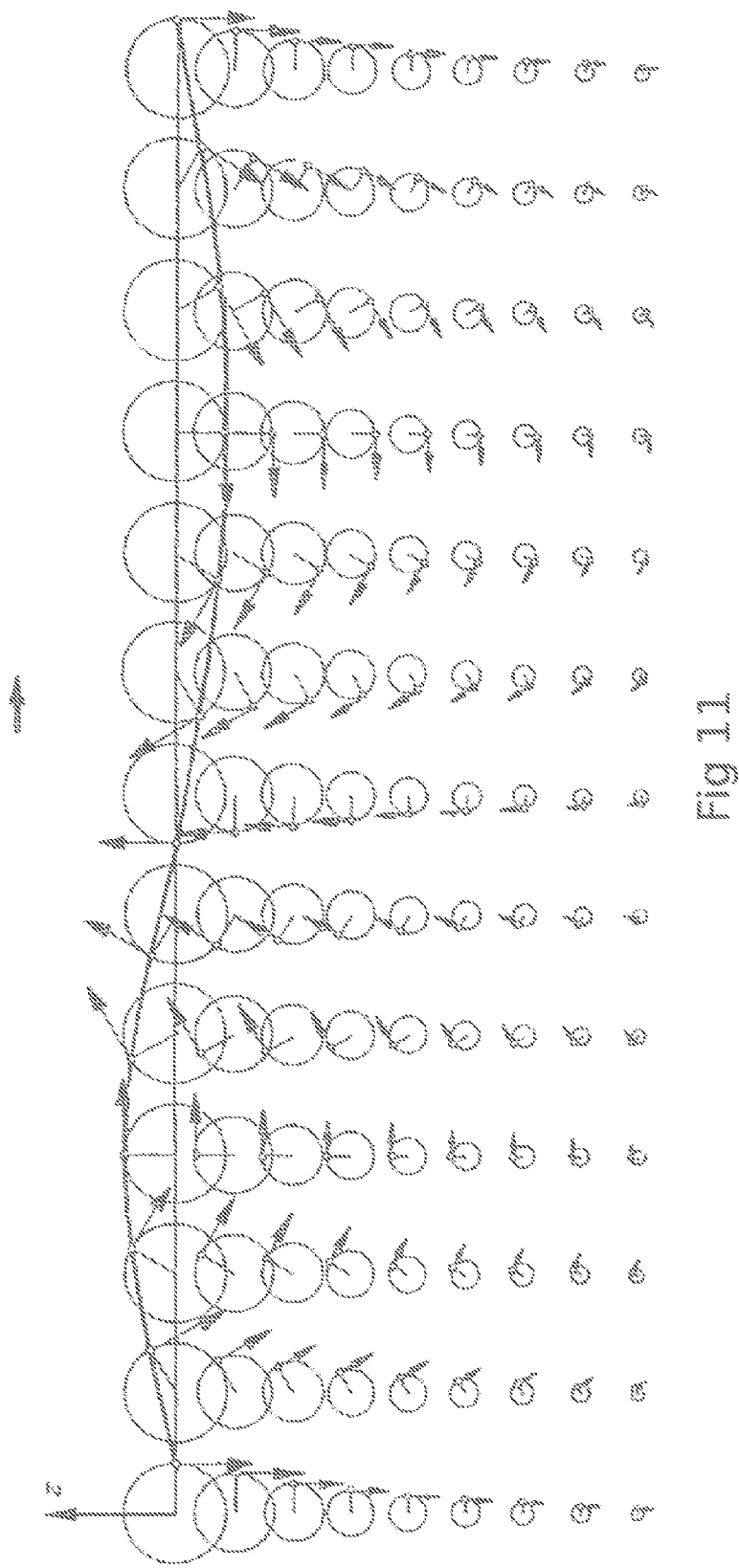

ROTATING APPARATUS

CROSS REFERENCE TO RELATED APPLICATIONS

This application is the U.S. National Phase of PCT/DK2009/050283, filed Oct. 29, 2009, which claims priority to Denmark application Serial No. PA200801485, filed Oct. 29, 2008, the entire contents of both of which are incorporated herein in their entirety.

FIELD OF THE INVENTION

The present invention relates to water power and conversion of energy, for instance to generate electricity.

BACKGROUND OF THE INVENTION

Many water power systems, in particular floating systems, cannot handle storm waves. Systems operating with large area panels perpendicular to the propagating direction of waves are susceptible to huge anchoring forces. Further, systems which make use of anchoring forces in order to produce energy, so-called point absorbers, as well as systems that depend on buoyancy bodies, have problems related to end stops.

It is known that not only the energy of the linear waterflow, but also the waterflow energy of waves, may be used for producing electricity as disclosed in the following documents:
WO 02/44558 A1 (Rossen) [0005] U.S. Pat. No. 6,036,443 A (Gorlov) [0006] DK 171714 (Stenberg) [0007] DE 102004060275 A1 (Jobb)

In addition, WO 2008/093037 A1 discloses an apparatus wherein blades impart rotation of a main body in response to a flow of fluid such that angular momentum of the main body is conserved upon a change of direction of fluid flow.

Systems that are driven by rotors are not as susceptible to faults related to end stops as non-rotor systems. The known rotors that are driven by the waterflow energy of waves are often based on stationary vertical drive shafts which transfer the rotational energy to a generator arranged above the water level outside the rotors. According to such systems, a pole is anchored to the seabed in order to absorb the counteracting torque related to the stator of the generator and to absorb the counteracting torque related to large axial and radial forces originating from long radial rotor blades. However, such systems are only for use in shallow waters. Further, since large forces related to storm waves are not easily handled by rotors having long rotor blades, an additional mechanism for protection of the system is needed, such as a mechanism for adjusting the height of the rotor and for retracting the blades.

Also known in the prior art are floating systems having a vertically orientated drive shaft in relation to counteracting torques of the stator of a generator, which drive shaft may be provided with rotor units rotating in opposite directions. In such systems, large axial damping panels can be arranged, e.g. 40 meters beneath sea level, which implies that the systems are for use only at locations where the ocean reaches great depths, such as more than 40 meters.

The efficiency of rotors having a vertical rotation axis is highly dependent on the position of the rotors with respect to the sea level, since the waterflow decreases exponentially with the distance from the water surface. Therefore, in relation to a pole mounted rotor system, a sufficiently large water depth, or an option for adjusting the position of the rotors with respect to the water level, is needed due to variations of the water level and variations of the wave amplitudes.

Rotor systems, which are adapted to take advantage of waterflow energy and having a horizontally orientated rotational drive shaft, are also known in the prior art. Such systems are rotationally supported in bearings in associated floating members, however, significant expenses and considerable maintenance is required in order to withstand the forces that are formed in the bearings.

In one of the prior art documents, the fabrication costs are sought to be reduced by considerable reduction of the diameter of the rotor. Further, in order to achieve a high energy conversion efficiency, many rotors are placed closely in parallel, with two associated generators, in a floating arrangement. Such arrangements have low operational reliability in particular due to floatsam.

To overcome the mentioned difficulties, it is an object of the invention to provide an improved rotating apparatus for harnessing the power of waterflow, in particular the power of water waves and the power of the linear waterflow, so that the above mentioned disadvantages are eliminated or reduced.

SUMMARY OF THE INVENTION

The object is achieved by a rotating apparatus for harnessing the power of water, particularly wave power, said apparatus comprising one or more rotor members adapted for rotation and driven by wave waterflows and/or linear waterflows by means of at least one drive element extending the rotor member(s), and said rotation having a non-changing rotational direction which is independent of the direction of the waterflows wherein at least one of the drive element is oscillatably altered when acted upon by a waterflow.

In a preferred embodiment, the apparatus is provided with axially connected elongated substantial horizontally floating or neutrally buoyant rotor members.

By the term non-changing, in relation to the rotational direction, is referred to a preferably continuous substantially uniform rotational motion with a direction which is not reversed when the apparatus is subjected to waterflows having different directions. In a preferred embodiment, the apparatus is adapted to harness the power of water, particularly wave power, in an environment having waterflows that change direction, preferably a horizontal change of direction, with a period of 1-8 seconds. Preferably the apparatus is surrounded by water and rotationally supported by the surrounded water; however, portions of the apparatus may extend above the water surface.

In a preferred embodiment, the apparatus is adapted to harness the waterflow energy of waves and/or the energy of linear waterflows and/or adapted to harness the energy related to combinations of wave-waterflows and linear waterflows.

In another preferred embodiment, at least one of the drive elements comprises a radially rigid portion arranged in the plane of rotation. In another embodiment, at least one of the drive elements is oscillatably altered when acted upon by a waterflow. Preferably, the at least one drive element comprises a resilient or elastic portion and is configured to be flexibly altered. More preferably, the at least one drive element has an aerodynamic shape or a fluid-dynamic shape and a symmetrical cross section. Preferably, the at least one drive element is most flexible at the end which is radially distant from the rotor and the at least one drive element may for instance comprise a portion having a gradient of flexibility with the most rigid part near the rotor. In a preferred embodiment, the at least one drive element is adapted to bend when it is oscillatably altered, for instance the at least one drive element may bend up to 45° with respect to its rest position.

The drive lements elements, such as fins, may each comprise a planar portion which, when the drive element is in a rest position, lies substantially in a plane that is perpendicular to or angled with respect to the rotor center axis. In one embodiment, the angle between the plane and the rotor center axis is substantially 90°. The angle may be less than 90° and the drive elements are not necessarily provided in a configuration wherein the angles corresponding to different drive elements are equal. For instance, the drive elements may be provided in a configuration where the angles alternate for every second drive element. In a related embodiment, there is provided a plurality of rotor planes each having a plurality of associated drive elements and the drive elements are configured so that the drive elements in succeeding rotor planes are provided with an angle of 22.5° with respect to the next and the previous rotor plane. The drive element of every fourth rotor plane are thereby provided with the same angle. In another embodiment, a plurality of the drive elements may be provided in a spiral configuration.

The drive elements may function in a way which can be compared to the reverse action of a fish's tail fin. Where a fish would move its tail fin in order to move forward, the drive elements are moved by waterflows in order to drive the rotor. Further, the drive elements in a rotor plane are deflected to the same direction if the wave propagation direction is parallel to the rotor center axis. Furthermore, the drive elements are most strongly deflected close to the wave surface because the velocity of the water flow is largest at the wave surface. In a preferred embodiment, at least one drive element is adapted to deflect into at least two directions. The drive means may thus be adapted for movement, such as movement wherein the drive elements are oscillatably altered, which involves a turning point.

In a preferred embodiment, a plurality of the drive elements are provided in a spoke arrangement and are rigidly, swivellingly or oscillatably/oscillatingly connected to a concentric ring.

In another preferred embodiment, at least one rotor member is watertight and at least one rotor member comprises: functional elements related to conversion of energy, at least one brake, and at least one eccentrical oscillating counteracting torque load arranged with an associated drive shaft.

In another embodiment, the apparatus comprises at least one non-rotating housing. Preferably, the housing is adapted for non-rotation because of a non-rotating keel member and more preferably, the at least one non-rotating housing is rotationally connected to at least one rotor member.

In another embodiment, the apparatus comprises at least one generator adapted to engage and disengage via at least one coupling.

In another embodiment, the draught of the apparatus is adjustable. For instance by ballast tanks provided in the housings and/or inside the rotor members.

In another embodiment, functional elements related to conversion of energy, such as generators and brakes, are provided in at least one anterior housing. The functional elements are preferably connected to a drive shaft which is directly connected to or connected by universal joints to at least one rotor member.

In another embodiment, the apparatus comprises at least a first and a second rotor member having oppositely directed rotation directions. The apparatus may have several rotor members alternately having opposite rotation directions.

The invention has advantages related to the horizontally arranged rotor floating (or being neutrally buoyant) in water, e.g. in one embodiment, the rotor may have a long length and a large weight due to the horizontal arrangement. The apparatus, which is supported by the surrounding water, is rotationally driven by the orbital waterflow and the linear waterflow. In addition, in another embodiment, the apparatus may comprise several rotors, connected by universal joints, which are provided on a common rotational drive shaft.

In one embodiment, the rotors may be provided with watertight inner spaces that may hold generators, other functional elements which need to be protected from water, several eccentrical oscillating counteracting torque loads that provide a counteracting torque related to centrally provided generators, and brakes which are adapted to stop the rotation of the rotors. The mechanical bearings are thus protected against impacts, contamination, and, in particular, water.

In another embodiment, no sealing devices are needed for associated moveable functional elements, because the wiring for electricity and/or other transfer media is adapted to rotate in the same direction as the rotors. In a related embodiment, the rotors are watertight and airtight, such that a dehumidifier can be installed in order to extend the life span of the apparatus and to reduce maintenance.

In another embodiment, the functional elements may comprise several modules which are separated by shutters or by rotors axially connected by universal joints. Preferably, the individual modules are adapted to be replaced in case of defects. Further, the wiring between the rotors may be conducted through the universal joints.

In another embodiment, the rotors are adapted to be rotated by a large number of waterflow driven fins that are provided lengthwise with the rotors and provided around the enclosure of the rotors. The rotors are preferably adapted so that the rotation direction of the rotors is non-changing and independent of the direction of the waterflows. Further, the fins, which are adapted to harness the energy of the waterflow of waves and the energy of linear waterflows, are preferably radially rigid in the plane of rotation and have an aerodynamic shape or a fluid-dynamic shape, with a symmetrical cross section.

In one embodiment, the shape of the fins is oscillatably altered perpendicularly and/or parallelly and/or angularly with respect to the plane of rotation when the fins are acted upon by a waterflow. In a preferred embodiment, the apparatus comprises a large number of fins having relatively short lengths. The fins of an apparatus with a large number of short length fins may have significantly reduced mechanical stress and strain compared to the fins, i.e. blades, of an apparatus having rotors with few but long radial rotor blades. In a related embodiment, the fins are provided in a spoke arrangement and in addition the spokes may be connected to a concentric ring. Because of the spoke arrangement, the life span of the fins is considerably increased in relation to storm waves. In addition the fins are easily accessible and their condition is easy to inspect.

The dimensioning of the fins, their shape, their oscillating properties, and their mutual arrangement can be optimized according to the type of waterflows present. In relation to substantially linear waterflows, e.g. related to tidal waterflows or similar, the apparatus may preferably be provided with fins that have specific shapes and are mutually arranged accordingly.

In one embodiment, the rotors are provided with concentric built-in generators that are adapted to be decoupled from the rotational counteracting torque loads in order to switch off the generators. No-load operation is thereby viable which may be used for instance in relation with a small starting torque, e.g. when the rotation of the rotor is initiated or for use in storm waves to prevent overload of the generator(s).

The generators are engaged depending on the strength of the waterflow and the engagement can be performed with a stepwise regulation of the shaft speed of the rotor so that the apparatus also may be operated in a small wave environment. The torque of the rotor is reduced according to the number of generators which preferably are arranged lengthwise relative to the rotor. This is important regarding the dimensioning of the elements which transfer the torque. Related to apparatuses having rotors connected by universal joints, one functional module and one generator may be arranged per rotor.

The life span of the generators is increased because the generators are engaged sequentially at low performance. In case of a defect related to braking procedures, where associated brakes are used in order to halt the rotation, all generators may be engaged to reduce the braking.

The rotor is only affected by small bending loads because of the small remaining buoyancy which can be distributed evenly across the length of the rotor. The bending loads can be further reduced by having several rotors axially connected by universal joints.

Due to large rotor weights and associated inertia related to the slim cylindrically shape of the apparatus, the apparatus dives through the waves by small vertical movements. Thereby an amplifying propelling effect is provided and in addition extreme mechanical stress and strain is prevented, in particular related to very large waves.

Further, unlike known rotors having a vertical drive shaft, the draught of the apparatus is relatively small because of the slim shape and the horizontal arrangement of the apparatus. The apparatus may therefore be used at various locations, only with trivial modifications, such as modifications with regard to anchoring at very large water depth locations and modifications regarding the length of the apparatus.

The axial forces exerted to the apparatus are compensated because of the oppositely directed particle flows in a wave environment and because of the large number of fins arranged on the rotor. An apparatus having a large rotor floating length is therefore only subjected to a small anchoring force. The anchoring force, which needs to be taken into account, is produced mainly by linear waterflows. This effect allows a very large rotor floating length in relation to harnessing energy of waterflows that mainly comprises wave waterflows. In addition, in relation with the large inertia of the apparatus, the stress and strain of the rotational bearings inside the apparatus related to impacts is reduced by the effect.

The apparatus may comprise non-rotating front and rear housings. These housings do not rotate because of an associated non-rotating keel. The housings are rotationally supported and connected to the rotor. As the need arises, the housings may contain ballast tanks, pumps, rotary bushings adapted for corresponding media, such as media related to electricity. The anterior housing and corresponding wiring are connected to a main anchoring member and the rear housing is, when needed, connected to an extra anchoring means. Because of the anchoring member connected to the anterior housing, the apparatus moves by itself into a position substantially parallel to the propagating direction of the waves and/or the direction of the linear waterflow. If both a wave waterflow and a linear waterflow are present, the apparatus moves by itself into a position between the directions of the wave waterflow and the linear waterflow, and said position is dependent on the strength of the waves and the strength of the linear waterflow. As the need arises, the position of the apparatus having a one-piece rotor can be optimized with respect to the wave waterflow and the linear waterflow with a regulated steering means that can be built into the rear housing.

In another embodiment, all the inner functional elements are arranged inside a floating front housing that does not rotate because of a non-rotating keel. The rotation of the rotor is transferred by universal joints or directly by a drive shaft which is supported by the front housing. In such an arrangement, the rotors may only contain ballast tanks, which are adapted to be filled by use of rotary bushings in the housings.

In one embodiment, parts of the apparatus are connected axially by universal joints or rigidly connected so that at least a first rotor is adapted to have a rotation direction oppositely directed with respect to the rotation direction of at least a second rotor, whereby counteracting torques of stators and brakes are compensated. For instance, two identical first and second arrangements, which comprise, respectively, first and second front housings connected, respectively, to first and second rotors, wherein the first rotation direction of the first rotor with respect to the first front housing is equal to the second rotation direction of the second rotor with respect to the second front housing, may be connected so that the first front housing is connected to the second front housing, for instance by turning one of the arrangements 180 degrees. The resulting apparatus may thereby comprise one part rotating clockwise connected to another part rotating counterclockwise, i.e. the resulting apparatus may have a first rotor having a rotation direction oppositely directed with respect to the rotation direction of a second rotor. An apparatus having first and second oppositely rotating parts connected is advantageous because the torque of the first part may cancel or compensate the torque of the second part. The stator of a first rotor may for instance be torque-compensatingly connected to the stator of a second rotor. In relation to torque-compensatingly connected rotors, the main anchoring may be connected to a distal member, such as a keel. In relation hereto, the required wiring for transferring, which is adapted for rotary bushings in the housings and adapted for the given rotation, may be conducted to an associated connection location at the main anchoring through the rotor(s).

In another embodiment, the apparatus comprises a one-piece rotor supported between housings. The housings may be provided with a buyancy buoyancy cavity having an aerodynamic or fluid-dynamic shape and preferably the buyancy buoyancy cavity extends above the water surface. The buyancy buoyancy cavities are used in combination with ballast tanks, which may be arranged inside the rotors and/or inside the housings, in order to adjust the draught and/or position of the apparatus with respect to the water level. Further, the buyancy buoyancy cavities and ballast tanks may be used in order to uphold the operational condition for instance in order to protect against floatsam and/or in relation to a long time operation. The weight of the apparatus can thereby be adjusted with respect to the weight of the surrounding water, for instance so that the density of the apparatus excluding the buyancy buoyancy cavities, becomes slightly greater than the density of the surrounding water. The increasing draught of the apparatus may thereby be adjusted by use of the buyancy buoyancy cavities, which are preferably arranged in the upper part of the housings or in the upper part of the middle housings. In the upper part of buyancy buoyancy cavities there may be provided a watertight hatch which may be used in relation to maintenance.

BRIEF DESCRIPTION OF THE DRAWINGS

The invention is disclosed in more detail with reference to the accompanying drawings, in which:

FIG. 7 is a side cross section view of a rotor, FIG. 8A is a cross section view of a rotor having associated drive elements, FIG. 8B is a cross section view of a fin, FIG. 9 is a side view showing the operation of a fin in a wave environment, FIG. 11 is a schematic of the path and velocities of particles in deep water waves.

DETAILED DESCRIPTION OF THE DRAWINGS

Figures 1A, 1B, 1C:
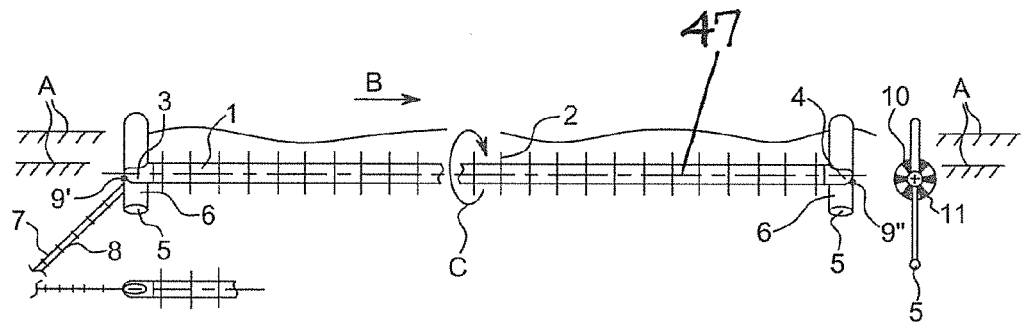
FIG. 1A is a side view of the apparatus according to a preferred embodiment of the invention.
FIG. 1B is a cross section view of the apparatus in FIG. 1A.
FIG. 1C is a top view of the apparatus in FIG. 1A.

With reference to FIG. 1-6, the apparatus is shown in a wave environment, having a water surface level A, wherein waves propagate in a direction B parallel to the lengthwise direction of the apparatus. Water tight floating rotors 1, 13, 18, 21, 28, 29, are rotated, in a circular rotation direction C perpendicular to the lengthwise direction of the apparatus, by drive elements 2 which extend from the rotors. The rotors are anchored by a main anchoring means 7 and connected to wires 8 for energy transport, such as electric energy, by a universal joint 9' at a first non-rotating end or anterior housing 3, 14, 20, 22 also called a front end housing. A second non-rotating end housing 4, 15, 23 is provided at the distal end of the apparatus whereto an additional anchoring means 9" may be connected. The wires 8 are flexibly conducted by universal joints 12 and are adapted for rotary bushings provided in the non-rotating end housings. The rotors and the non-rotating end housings contain ballast tanks which can be filled or emptied by pumps in order to adjust the draught of the apparatus.

The upper parts of the non-rotating end housings are provided with buoyancy cavities, which, in cooperation with the ballast tanks, allow the draught of the apparatus to be adjusted. A keel 6, being weighed down by an extra body 5, is provided in the lower part of the non-rotating end housings. The buoyancy cavities in the upper part of the non-rotating end housings cause also, together with the body 5, that the keel 6 stays in a low position.

With reference to FIG. 1A, the apparatus is shown according to an embodiment wherein there is provided a one-piece elongated rotor 1, which contain one or more generators having associated couplings, brakes, eccentric loadings oscillatably mounted on bearings to a central drive shaft 47. The front end housing 3 and the rear end housing 4 are adapted to be non-rotatable and mounted on bearings to the rotor 1. The front end housing 3 contains rotary bushings for corresponding media, such as electricity. In addition, the fins 10 of the apparatus are fixed to the rotor 1 in a ring formed configuration 11, cf. FIG. 1B.

Figure 2:
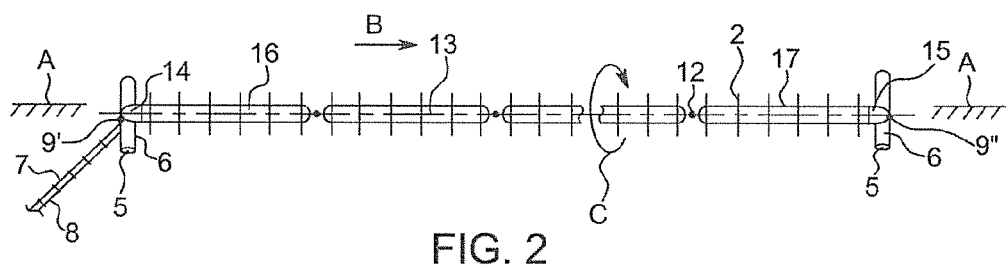
FIG. 2 is a side view of the apparatus according to another embodiment of the invention.

With reference to FIG. 2, the apparatus is shown according to an embodiment similar to the embodiment of FIG. 1, but with several axially connected rotors 13, 16, 17 connected by universal joints 12. The front end housing 14 is non-rotatably mounted on bearings to the first rotor 16 and the rear end housing 15 is non-rotatably mounted on bearings to the last rotor 17. Each rotor contains a functional module, such as generators having associated couplings, brakes, eccentric loadings oscillatably mounted on bearings to a central drive shaft. Wires 8, in particular suited for electricity, are flexibly conducted though universal joints 12.

Figures 3A, 3B, 3C:
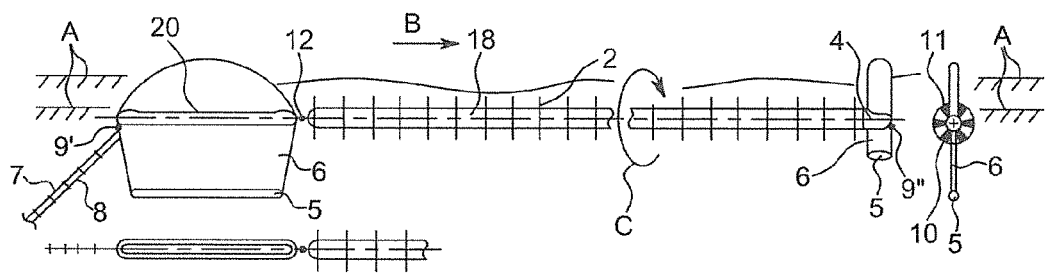
FIG. 3A is a side view of the apparatus according to another embodiment of the invention.
FIG. 3B is a cross section view of the apparatus in FIG. 3A.
FIG. 3C is a top view of the apparatus in FIG. 3A.

With reference to FIG. 3A, the apparatus is shown according to an embodiment wherein there is provided a one-piece elongated rotor 18 which only contains ballast weights, such as ballast tanks and associated pumps. The front non-rotating end housing 20, which is connected to the rotor 18 by a universal joint, contain the remaining functional modules. The universal joint 12 is connected to a drive shaft which is mounted on bearings to the front end housing 20 in order to drive one or more generators. A vertically and horizontally elongated keel 6, having a large surface area, provides the necessary counteracting torque. In addition, the fins 10 of the apparatus are fixed to the rotor 1 in a ring formed configuration 11, cf. FIG. 3B. In another embodiment, the rotor 18 is rigidly connected to a drive shaft in the end housing 20.

Figure 4:
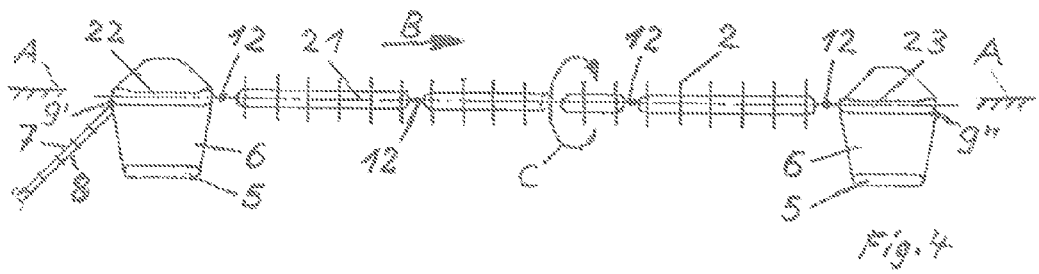
FIG. 4 is a side view of the apparatus according to another embodiment of the invention.

With reference to FIG. 4, the apparatus is shown according to an embodiment similar to the embodiment of FIG. 3, but with several axially connected rotors 21 connected by universal joints 12. The rotors 21 only contain ballast weights, such as ballast tanks. The front end housing 22 and the rear end housing 23 contain identical functional modules, such as generators, couplings, brakes, and current conduction means. Thus compared to the embodiment of FIG. 3, the transferred torque and the necessary counteracting torque per end housing are cut in half for the same rotor length.

Figure 5:
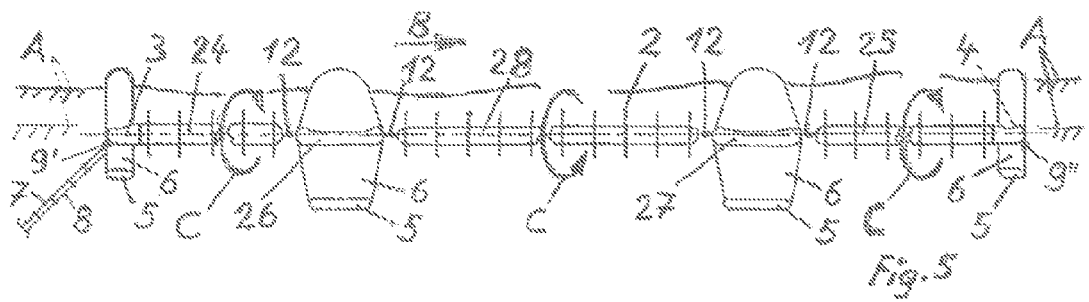
FIG. 5 is a side view of the apparatus according to another embodiment of the invention.

With reference to FIG. 5, the apparatus is shown according to an embodiment wherein there is provided two identical subsystems having distal rotors 24, 25 which have rotation directions oppositely directed with respect to a middle rotor 28. Housings 26, 27 are provided with identical functional modules and are connected by universal joints to the middle rotor 28 having twice the length of the distal rotors on the other side of the housings.

Figure 6:
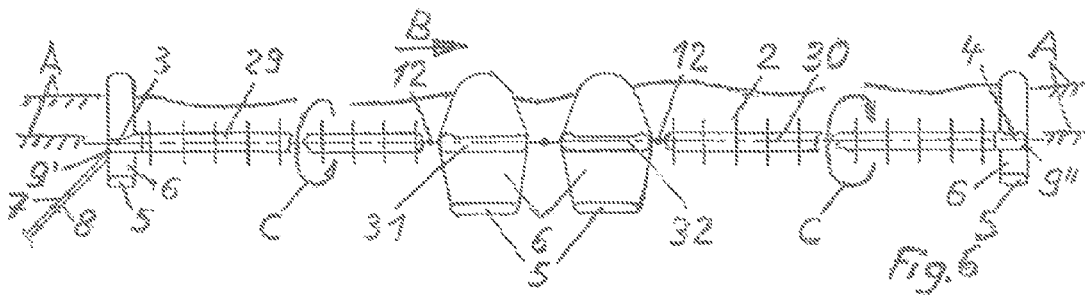
FIG. 6 is a side view of the apparatus according to another embodiment of the invention.

With reference to FIG. 6, the apparatus is shown according to an embodiment wherein there is provided two identical subsystems wherein a first one-piece rotor 29 which have a rotation direction which is oppositely directed with respect to the rotation direction of a second one-piece rotor 30. The first rotor is connected to a first housing 31 which is connected by universal joints to a second housing 32 which is connected to the second rotor 30.

All the connections involving universal joints, in relation to FIG. 3-6, between the end housings and the rotor may alternatively be provided rotationally mounted directly on the rotor, similar to all the rear end housings 4.

In the embodiments shown in FIG. 5 and FIG. 6, the main anchoring means 7 is secured to the front housing. Further, the counteracting torques due to the stator of the generator and due to braking may compensate so that the keels 6 can be dimensioned smaller. Furthermore, the apparatuses described above may be further elongated by universal joints whereby the rear end housing and/or the front end housing becomes an intermediate housing.

With reference to FIG. 7, the apparatus is shown having a rotor 1 and a functional module composed of drive elements 2 (comprising fins 10), concentrical rings 11, module separator 40, generator 41, ballast room 42 which may be connected to a generator cooling system, coupling 43, cross links 44, brake 45, and oscillating counteracting torque loadings 46. Associated bearings may comprise ball bearings or roller bearings.

With reference to FIG. 8A, there is shown a cross section view of a rotor wherein the drive elements comprise fins 10 and a concentrical ring 11. A cross section of a related fin is shown in FIG. 8B.

With reference to FIG. 8A, there is shown a cross section view of a rotor wherein the drive elements comprise fins 10 and a concentrical ring 11. A cross section of a related fin is shown in FIG. 8B.

With reference to FIG. 9, the operation of a fin is shown in a wave environment wherein a wave propagates in a direction B. The movement of the fin is shown according to incremental changing direction of water particles, see also FIG. 11. The associated direction of water particles is illustrated with arrows at the corresponding amplitudes of the wave. The turning point of the movement of a fin is determined by the direction of water particles and the strength of the water particles weighed against the spring force of the fin.

Figure 10:
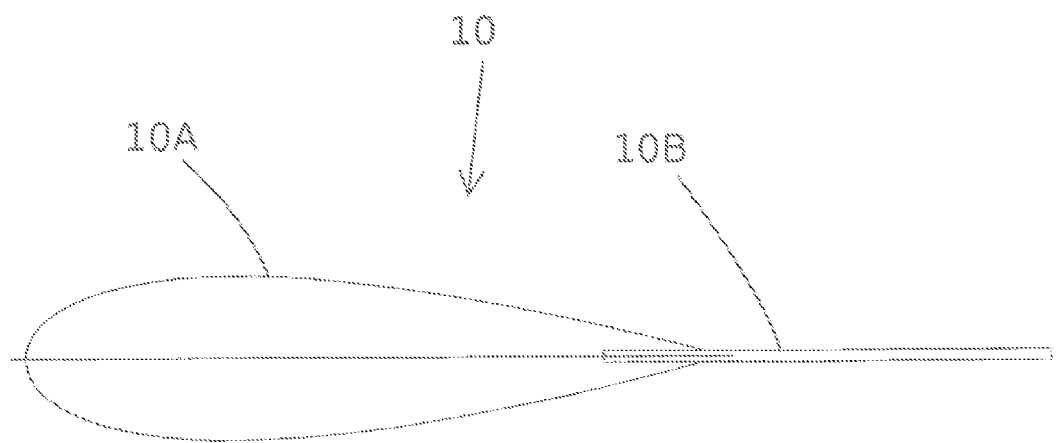
FIG. 10 is a cross section view of a fin.

With reference to FIG. 10, a cross section of a fin 10 is shown, said fin 10 having a symmetric curved profile portion 10A as an attachment for the flexible trailing end portion 10B. The trailing end portion is added in order to make the profile shape variable, and thus adapted for alternating flows.

With reference to FIG. 11, a schematic of the path and velocities of particles in waterflows in deep water waves is shown by which the alternating flow directions are illustrated. In shallow waters, the circles are transformed into ellipses that have a horizontal diameter which is greater than their vertical diameter. The schematic is from page 113 of the book 'Meerestechnische Konstruktionen' by G. Clauss, E. Lehmann, and C. Ostergaard, Springer-Verlag 1988.

While specific and preferred embodiments of the invention have been shown and described in detail above to illustrate the inventive principles, it is realised that variants to these embodiments may be provided without departing from the scope of the invention as set forth in the accompanying claims.

The invention claimed is:

1. A rotating apparatus for harnessing the power of wave waterflows and linear waterflows, said apparatus comprising:
   at least one rotor member being rotatable about a longitudinal rotor axis and rotationally driven by at least one of wave and/or linear waterflows, the at least one rotor member configured to be floating or neutrally buoyant in water with the longitudinal rotor axis disposed substantially horizontally; and
   at least one drive element extending generally radially outwardly from the rotor axis of each rotor member;
   wherein the rotating apparatus is configured such that the longitudinal rotor axis of the at least one rotor is oriented substantially in a direction of propagation of waves or in a direction of linear waterflows or in a direction of a combination of propagation of waves and linear waterflows;
   wherein the at least one rotor member is rotatable in only one direction independent of the direction of waterflow; and
   wherein the at least one drive element comprises a resilient or elastic portion configured to deflect back and forth in a direction of the longitudinal axis during rotation of the respective rotor member, such that a shape of each of the drive elements is flexibly altered during rotation of the respective rotor member when acted upon by a waterflow.

2. The apparatus according to claim 1, wherein the at least one rotor member comprises a plurality of rotor members that are axially connected, elongated, substantially horizontal, and floating or neutrally buoyant.

3. The apparatus according to claim 1, wherein the at least one rotor member and the at least one drive element harnesses the energy of wave or linear waterflows or a combination of wave and linear waterflows.

4. The apparatus according to claim 1, wherein the at least one drive element further comprises a rigid portion radially extending from the at least one rotor member.

5. The apparatus according to claim 1, wherein the at least one drive element is a plurality of the drive elements, the plurality of drive elements being provided in a spoke arrangement and rigidly, swivellingly or flexibly connected to a concentric ring member.

6. The apparatus according to claim 1, wherein the at least one rotor member is watertight and includes energy conversion elements, at least one brake, and at least one eccentrically oscillating counteracting torque load arranged with an associated drive shaft.

7. The apparatus according to claim 1, further comprising at least one non-rotating housing.

8. The apparatus according to claim 1, further comprising at least one generator which can be engaged and disengaged to the at least one rotor member via a coupling.

9. The apparatus according to claim 1, further comprising a ballast tank such that the apparatus has an adjustable draught.

10. The apparatus according to claim 1, further comprising:
    a front end housing coupled to the at least one rotor member; and
    a generator and a brake disposed in the anterior housing.

11. The apparatus according to claim 1, wherein the at least one rotor member comprises at least a first and a separate second rotor member, the second rotor member being rotatable in a direction opposite to a direction of the first rotor member.

12. A rotating apparatus for harnessing the power of wave waterflows and linear waterflows, the apparatus comprising:
    at least one rotor member being rotatable about a longitudinal rotor axis and rotationally driven by at least one of wave and/or linear waterflows, the at least one rotor member configured to be floating or neutrally buoyant in water with the longitudinal rotor axis disposed substantially horizontally; and
    at least one drive element extending generally radially outwardly from the rotor axis of each rotor member;
    wherein the rotating apparatus is configured such that the longitudinal rotor axis of the at least one rotor is oriented substantially in a direction of propagation of waves or in a direction of linear waterflows or in a direction of a combination of propagation of waves and linear waterflows;
    wherein the at least one rotor member is rotatable in only one direction independent of the direction of waterflow; and
    wherein the at least one drive element includes a resilient or elastic portion configured to deflect back and forth in a direction of the longitudinal axis when acted upon by a waterflow.

13. A rotating apparatus for harnessing the power of water, said apparatus comprising:
    at least one rotor member being rotatable about a rotor axis and driven by at least one of wave and linear waterflows, the at least one rotor member being horizontally arranged and floating or being neutrally buoyant in water;
a plurality of drive elements extending generally radially outwardly from the rotor axis of the at least one rotor member, the plurality of drive elements being provided in a spoke arrangement and rigidly, swivellingly or flexibly connected to a concentric ring member;
wherein the at least one rotor member is rotatable in one direction being independent to a direction of waterflow; and
wherein at least a portion of each of the plurality of drive elements moves back and forth when acted upon by a waterflow; and
wherein each of the plurality of drive elements comprises a resilient or elastic portion such that a shape of each of the plurality of drive elements is flexibly altered when acted upon by a waterflow.

14. A rotating apparatus for harnessing the power of water, said apparatus comprising:
at least one rotor member being rotatable about a rotor axis and driven by at least one of wave and linear waterflows, the at least one rotor member being horizontally arranged and floating or being neutrally buoyant in water, the at least one rotor member being watertight and including energy conversion elements, at least one brake, and at least one eccentrically oscillating counteracting torque load arranged with an associated drive shaft;
at least one drive element extending generally radially outwardly from the rotor axis of the at least one rotor member;
wherein the at least one rotor member is rotatable in one direction being independent to a direction of waterflow; and
wherein at least a portion of the at least one drive element moves back and forth when acted upon by a waterflow; and
wherein the at least drive element comprises a resilient or elastic portion such that a shape of the at least one drive element is flexibly altered when acted upon by a waterflow.

* * * * *